(12) United States Patent
Lee

(10) Patent No.: US 7,717,571 B2
(45) Date of Patent: May 18, 2010

(54) PROJECTOR/PROJECTION TYPE SWITCHABLE DISPLAY APPARATUS

(75) Inventor: Young-chol Lee, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 752 days.

(21) Appl. No.: 11/599,414

(22) Filed: Nov. 15, 2006

(65) Prior Publication Data

US 2007/0109509 A1    May 17, 2007

(30) Foreign Application Priority Data

Nov. 15, 2005    (KR) .................... 10-2005-0108926

(51) Int. Cl.
*G03B 21/28* (2006.01)
*G03B 21/14* (2006.01)
(52) U.S. Cl. .......................................... 353/79; 353/77
(58) Field of Classification Search .................. 353/73, 353/79, 74, 77
See application file for complete search history.

(56) References Cited

U.S. PATENT DOCUMENTS

| | | | | |
|---|---|---|---|---|
| 2,855,823 A | * | 10/1958 | Klaus | 355/67 |
| 4,572,632 A | * | 2/1986 | Bodier et al. | 353/71 |
| 5,090,800 A | | 2/1992 | Ushiro | |
| 5,343,262 A | | 8/1994 | Park | |
| 5,396,301 A | * | 3/1995 | Sasaki et al. | 348/794 |
| 6,525,750 B1 | * | 2/2003 | Knox | 345/30 |
| 6,750,832 B1 | * | 6/2004 | Kleinschmidt | 345/7 |
| 6,771,427 B1 | * | 8/2004 | Matsuo | 359/649 |
| 7,029,131 B2 | * | 4/2006 | Furuichi | 353/98 |
| 7,110,796 B2 | * | 9/2006 | Lee | 455/566 |
| 7,252,394 B1 | * | 8/2007 | Fu | 353/98 |
| 7,354,158 B2 | * | 4/2008 | Katase | 353/77 |
| 7,416,306 B2 | * | 8/2008 | Yamamoto et al. | 353/31 |
| 2001/0048406 A1 | * | 12/2001 | Masumoto et al. | 345/48 |
| 2003/0174120 A1 | | 9/2003 | Weiner et al. | |
| 2007/0153242 A1 | * | 7/2007 | Sokolov et al. | 353/119 |
| 2008/0129965 A1 | * | 6/2008 | Yonekubo | 353/85 |

FOREIGN PATENT DOCUMENTS

| | | |
|---|---|---|
| CN | 1112802 A | 11/1995 |
| JP | 63-182979 A | 7/1988 |
| JP | 1-257834 A | 10/1989 |
| JP | 02-004286 A | 1/1990 |
| JP | 06-202224 A | 7/1994 |
| JP | 09-236871 A | 9/1997 |
| JP | 9-236871 A | 9/1997 |
| KR | 97-19542 A | 4/1997 |
| WO | 2004/111699 A1 | 12/2004 |

\* cited by examiner

*Primary Examiner*—Georgia Y Epps
*Assistant Examiner*—Danell L Owens
(74) *Attorney, Agent, or Firm*—Sughrue Mion, PLLC

(57) ABSTRACT

A projector/projection type switchable display apparatus includes: a main body unit having an image producing unit forming and emitting an image; and a cover unit that is rotatably connected to the main body unit. The cover unit includes an aspherical mirror enlarging and reflecting the image emitted from the main body unit; and a screen on which the image enlarged and reflected by the aspherical mirror is displayed.

13 Claims, 4 Drawing Sheets

PROJECTOR/PROJECTION TYPE SWITCHABLE DISPLAY APPARATUS

CROSS-REFERENCE TO RELATED PATENT APPLICATION

This application claims the benefit of Korean Patent Application No. 10-2005-0108926, filed on Nov. 15, 2005 in the Korean Intellectual Property Office, the disclosure of which is incorporated herein in its entirety by reference.

BACKGROUND OF THE INVENTION

1. Field of the Invention

The present invention relates to a display apparatus, and more particularly, to a projector/projection type switchable display apparatus which can be made in a small size for portability.

2. Description of the Related Art

Generally, in a projector type display apparatus, an illuminating light is emitted onto a micro display panel such as a liquid crystal display (LCD) panel, and is enlarged and reflected onto an external screen to realize a large image. In terms of large displays for home theater systems, projector type display devices provide good value considering their size. However, images of projector type display devices can be viewed only in the dark, and a light path in front of the screen needs to be clear so that the images are not blocked.

Projection type display devices, such as projection televisions, have a similar structure to projector type display devices. The difference between these devices is that the path of light emitted from a light source in a projection television is bent by a mirror to project an image on a screen. Projection type display devices need a space behind the screen to display images, but images can be viewed even when the surroundings are not dark, and space in front of the screen is not wasted.

Recently, display devices in which a mirror is detachably installed to bend the path of the light for use as projector or projection type devices have been developed.

The projector/projection type display devices have been large screen display devices used for home theater equipment or office devices. However, with the recent development of mobile multimedia broadcasting, like digital multimedia broadcasting (DMB), a small-sized portable projector/projection type switchable display device is required. For example, when a mobile display apparatus combined with a cell phone or a PDA can display an image in a projector type display, it is possible for many people to watch broadcasting programs in a small area. Also, if a user wants to watch the broadcasting alone, the broadcasting can be watched through a screen of the cell phone in a projection mode.

SUMMARY OF THE INVENTION

Illustrative, non-limiting exemplary embodiments of the present invention overcome the above disadvantages, and other disadvantages not described above.

The present invention provides a projector/projection type switchable display device which can be made in a small size, and can be used in mobile communication equipment.

According to an aspect of the present invention, there is provided a projector/projection type switchable display apparatus which comprises a main body unit comprising an image producing unit forming and emitting an image; and a cover unit that is rotatably connected to the main body unit. It comprises an aspherical mirror enlarging and reflecting the image emitted from the main body unit; and a screen on which the image enlarged and reflected by the aspherical mirror is displayed.

Also, a light emitting hole through which the image is emitted may be formed in a side of the main body unit.

According to another aspect of the present invention, when the cover unit is at an angle to the main body unit, the aspherical mirror may face the light emitting hole of the main body unit, and the image is reflected by the aspherical mirror and displayed on the screen of the cover unit in a projection mode, and when the cover unit is folded over a top surface of the main body unit, the image emitted from the main body unit is directly displayed on an external screen in a projector mode.

According to another aspect of the present invention, a projection optical system may be further installed in the light emitting hole of the main body unit to project the emitted image.

According to still another aspect of the present invention, the image producing unit comprises: a plurality of light sources respectively emitting light beams having different wavelengths; a plurality of light modulators respectively modulating the light beams according to color signals; a plurality of light synthesizing units respectively synthesizing the light beams modulated by the light modulators into a single beam; and vertical and horizontal micro scanning mirrors scanning the synthesized beam in a vertical direction and a horizontal direction, respectively.

The light sources may be laser diodes (LDs) or light emitting diodes (LEDs).

The light synthesizing unit may comprise a plurality of dichroic mirrors that are arranged in a row on a light emitting surface of the light modulators and respectively reflect corresponding light beams and transmit the other light beams.

According to another aspect of the present invention, there is provided a projector/projection type switchable display apparatus which comprises a main body unit that includes a plurality of light sources respectively emitting light beams having different wavelengths, a plurality of light modulators respectively modulating the light beams according to color signals, a plurality of light synthesizing units respectively synthesizing the light beams modulated by the light modulators into a single beam, and vertical and horizontal micro scanning mirrors scanning the synthesized beam in a vertical direction and a horizontal direction, respectively. A cover unit is rotatably connected to the main body unit and it comprises an aspherical mirror enlarging and reflecting the synthesized beam emitted from the main body unit, and a screen on which the synthesized beam enlarged and reflected by the aspherical mirror is displayed.

BRIEF DESCRIPTION OF THE DRAWINGS

The above and other aspects of the present invention will become apparent and more readily appreciated from the following description of the embodiments, taken in conjunction with the attached drawings in which.

DETAILED DESCRIPTION OF THE EXEMPLARY EMBODIMENTS OF THE INVENTION

The present invention will now be described more fully with reference to the accompanying drawings, in which exemplary embodiments of the invention are shown.

Figure 1:
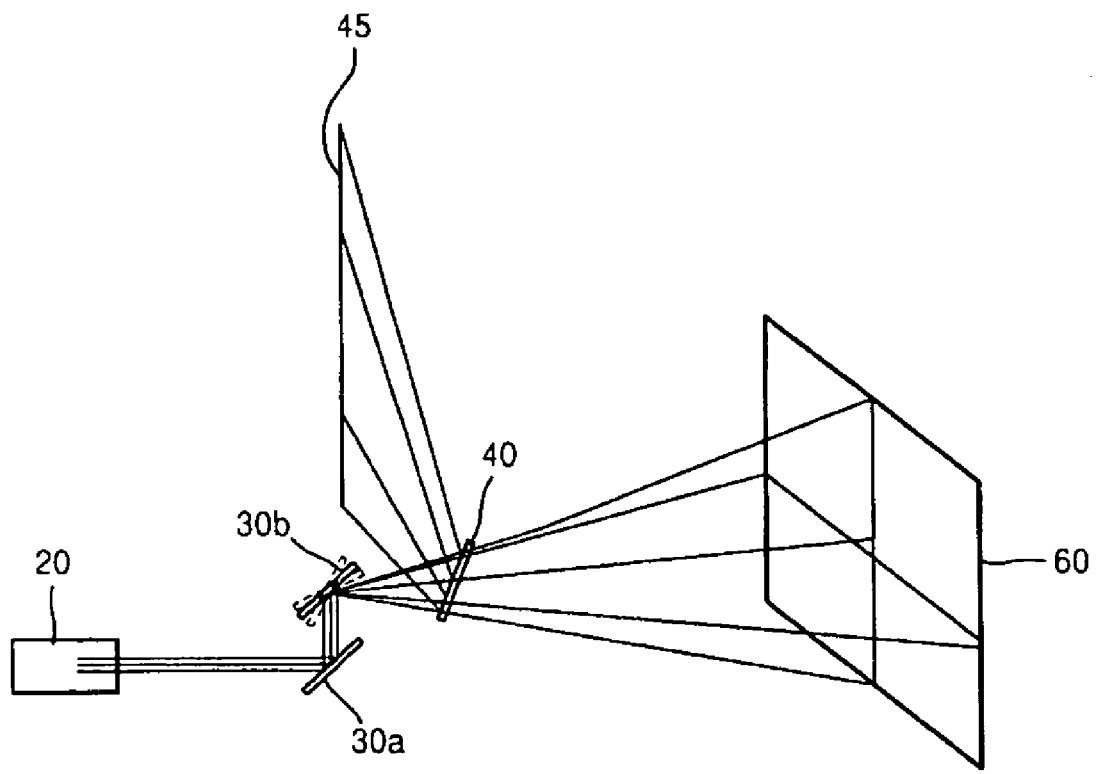
FIG. 1 shows the principle of a projector/projection type switchable display apparatus according to an exemplary embodiment of the present invention.

FIG. 1 shows the principle of a projector/projection type switchable display apparatus according to an exemplary embodiment of the present invention. Referring to FIG. 1, when a light source and a light modulator 20 form an image to be scanned on a screen, a horizontal scanning mirror 30a and a vertical scanning mirror 30b which rotate like seesaws at high speed scan the image in a horizontal direction and a vertical direction, respectively. The light source and the light modulator 20 and the horizontal and vertical scanning mirrors 30a and 30b constitute an image producing unit of the projector/projection type switchable display apparatus of the present exemplary embodiment. In the above described configuration, to display an image in a projection mode, the image scanned by the horizontal and vertical scanning mirrors 30a and 30b is enlarged and reflected by an aspherical mirror 40 and is displayed on a projection screen 45. To display an image in a projector mode, the aspherical mirror 40 is removed from the light path and the image scanned by the horizontal and vertical scanning mirrors 30a and 30b is displayed directly on a projector screen 60.

Figure 2:
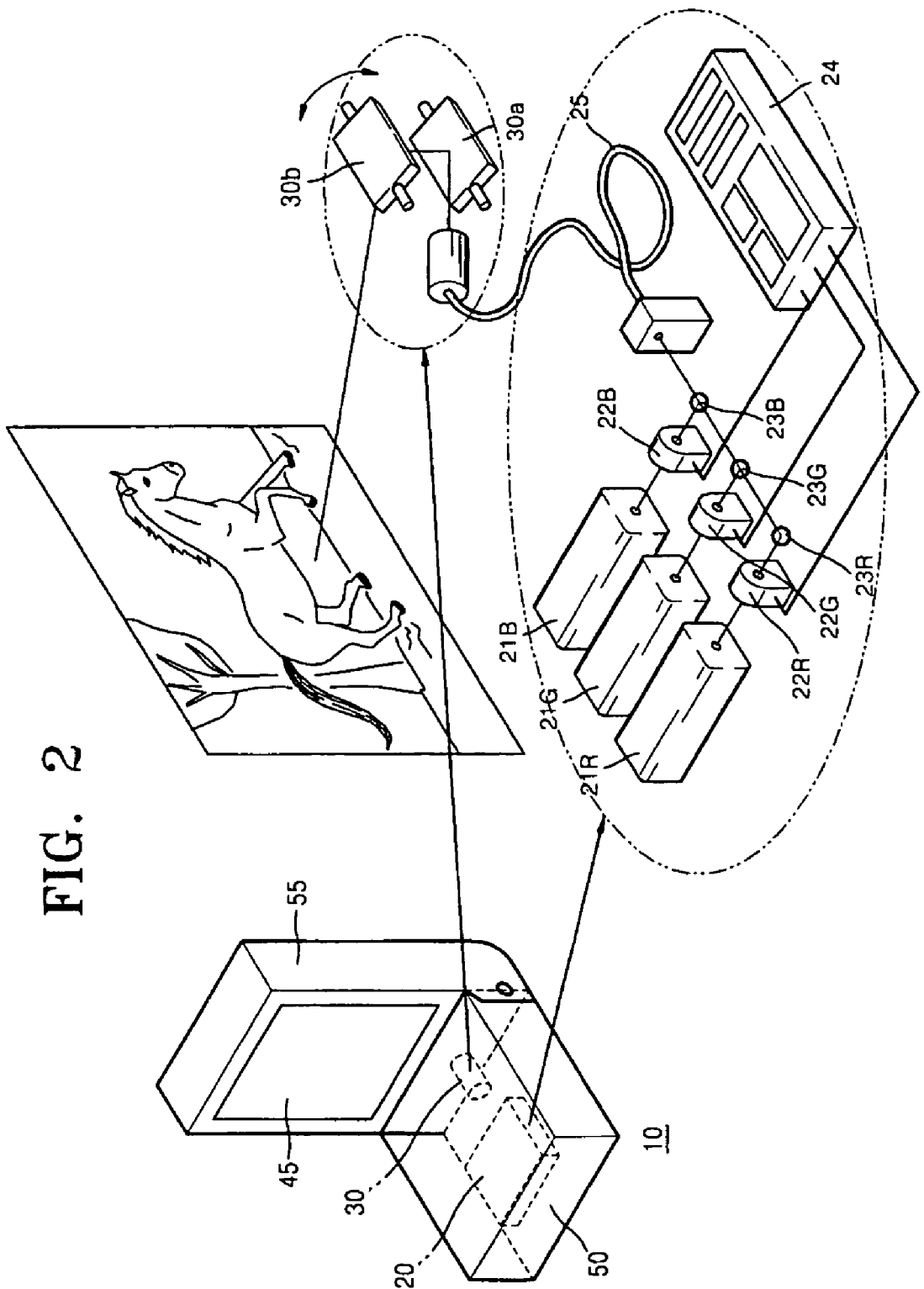
FIG. 2 is a detailed schematic diagram of the projector/projection type switchable display apparatus displaying an image.

FIG. 2 is a detailed schematic diagram of the projector/projection type switchable display apparatus 10, which can be made portable, displaying an image. As illustrated in FIG. 2, the projector/projection type switchable display apparatus 10 includes a main body unit 50 in which the image producing unit having the light source and the light modulator 20 and a scanning mirror unit 30 is installed and a cover unit 55 that is rotatably connected to the main body unit 50. The projection screen 45 and the aspherical mirror 40 are installed in the cover unit 55.

According to an exemplary embodiment of the present invention, the image producing unit installed in the main body unit 50 can be realized based on the principle of a laser image projecting apparatus. That is, referring to FIG. 2, the image producing unit includes a plurality of light sources 21R, 21G, and 21B respectively emitting colored light beams having different wavelengths, light modulators 22R, 22G and 22B respectively modulating the colored light beams according to color signals, a light synthesizing unit (23R, 23G, and 23B) respectively synthesizing the colored light beams modulated by the light modulators 21R, 21G, and 21B into a single light beam, and the vertical and horizontal micro scanning mirrors 30a and 30b scanning the synthesized beams in a vertical direction and a horizontal direction, respectively.

The light sources 21R, 21G, and 21B may be laser diodes (LDs) or light emitting diodes (LEDs) respectively emitting R, G and B light. The R, G and B light emitted from the light sources 21 R, 21G, and 21B is incident on the light modulators 22R, 22G, and 22B. The light modulators 22R, 22G, and 22B respectively modulate the R, G and B light incident thereon under the control of a light modulation controlling unit 24. The light modulation controlling unit 24 controls the light modulators 22R, 22G, and 22B according to color signals of an image to be formed, and allows the R, G and B light emitted from the light modulators 22R, 22G, and 22B to have a predetermined intensity. Then the R, G and B light modulated by the light modulators 22R, 22G, and 22B is synthesized into a single light beam by the light synthesizing unit 23R, 23G, and 23B. The light synthesizing unit (23R, 23G, and 23B) may be a plurality of dichroic mirrors that are arranged in a row on light emitting surfaces of the light modulators 22R, 22G, and 22B, and respectively reflect the R, G and B light and transmit light having other wavelengths. For example, a first dichroic mirror 23R reflects the R light onto a second dichroic mirror 23G. The second dichroic mirror 23G transmits the R light and reflects the G light onto the third dichroic mirror 23B. The third dichroic mirror 23B transmits the R and G light and reflects the B light, thus synthesizing the R, G and B light into a single beam.

The synthesized R, G and B light propagates to a scanning mirror unit 30 through an optical fiber 25. The scanning mirror unit 30 includes the horizontal scanning mirror 30a scanning the incident light horizontally and the vertical scanning mirror 30b scanning the incident light vertically. The horizontal and vertical scanning mirrors 30a and 30b may be, for example, micro scanning mirrors that drive micro mirrors having a size of several milimeters at high speed using a micro-electro-mechanical system (MEMS) and are well known in the art. The micro mirrors in the present exemplary embodiment can rotate the micro mirrors in a seesaw motion at 10-30 kHz using an electrostatic effect obtained with a comb-typed electrode structure. The horizontal and vertical scanning mirrors 30a and 30b horizontally and vertically scan the light at high speed, and thus an image with high resolution can be formed on a two-dimensional screen.

The image producing unit based on the laser image projection principle in the above-described configuration can be manufactured in a relatively small size, and thus is suitable to manufacture to small display apparatuses for mobile equipment. Moreover, since an image is formed by scanning direct light such as a laser, an additional complex optical system is not required. However, the configuration of the image producing unit of the projector/projection type switchable display apparatus according to the above exemplary embodiment is not limited thereto, and other various configurations are also possible. For example, the image producing unit can be implemented using a small LCD panel and a projection optical system.

Figure 3:
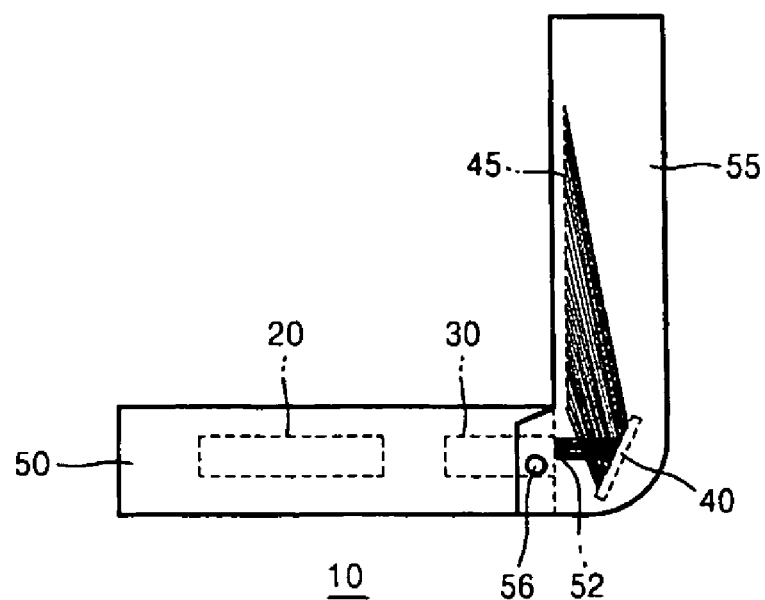
FIG. 3 is a schematic diagram of the projector/projection type switchable display apparatus displaying an image in a projection mode.

FIG. 3 is a schematic diagram of the projector/projection type switchable display apparatus 10 operating in a projection mode. Referring to FIG. 3, to display an image in a projection mode, the cover unit 55 is rotated about a hinge member 56 to be at a right angle to the main body unit 50. The aspherical mirror 40 installed along an edge of the cover unit 55 is rotated to face a light emitting hole 52 formed at a side of the main body unit 50. Thus the image formed by the light source and the light modulator 20 of the main body unit 50 is emitted through the light emitting hole 52 and enlarged and reflected by the aspherical mirror 40. The aspherical mirror 40 has an aspherically sculptured surface to reflect the incident image onto the projection screen 45 without aberration or distortion. Accordingly, the image can be displayed on the projection screen 45 installed in the cover unit 55.

The projection screen 45 of the projector/projection type switchable display apparatus 10 according to the present exemplary embodiment may have a size of about 5 inches. Thus, the user can view an image in a projection mode in a narrow room, like on a subway or bus.

Figure 4:
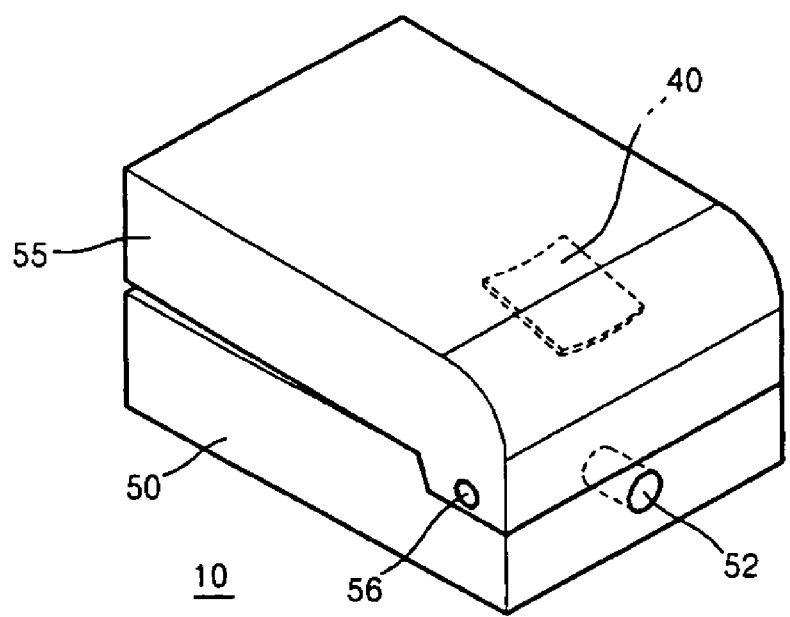
FIGS. 4 and 5 are schematic diagrams of the projector/projection type switchable display apparatus displaying an image in a projector mode.
Figure 5:
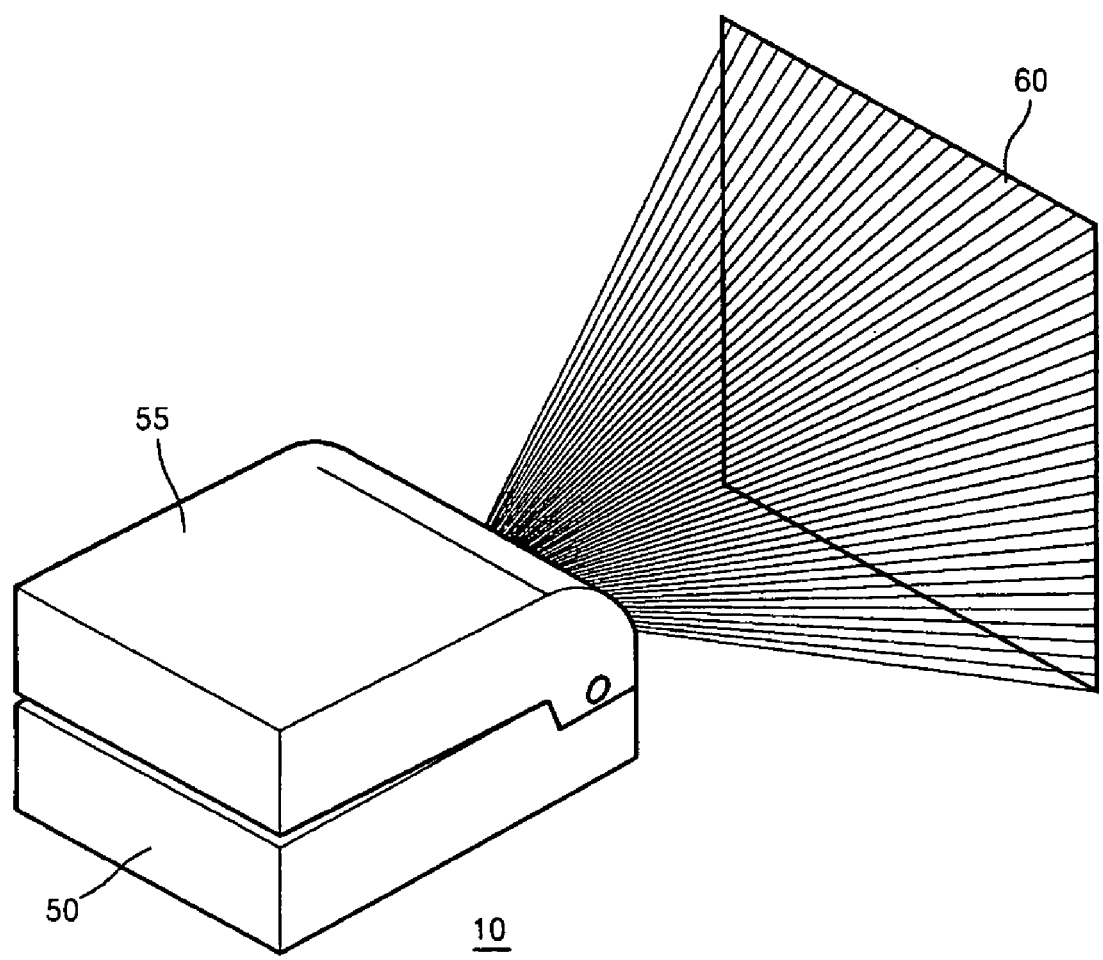

FIGS. 4 and 5 are schematic diagrams of the projector/projection type switchable display apparatus 10 displaying an image in a projector mode. Referring to FIG. 4, when an image is displayed in the projector mode, the cover unit 55 is rotated about the hinge member 56 toward a top surface of the main body unit 50. The aspherical mirror 40 installed in the cover unit 55 rotates with the cover unit 55 and is removed from the optical path of the image. As a result, the light emitting hole 52 through which the image is emitted is exposed to the outside, and as illustrated in FIG. 5, the image formed by the image display apparatus of the main body unit 50 is displayed directly on the projector screen 60 installed outside without being reflected. The projector screen 60 may be a portable screen or just a wall in a room.

Consequently, as illustrated in FIGS. 4 and 5, when the cover unit 55 is folded toward the top surface of the main body unit 50, an image can be displayed in the projector mode. In this case, the projector/projection type switchable display apparatus 10 becomes a portable small projector. According to the present embodiment, when an image is displayed in the projector mode, the image can be about 20-40 inches wide. Accordingly, many people can view a relatively large image using the projector/projection type switchable display apparatus 10.

Also, when the image producing unit of the projector/projection type switchable display apparatus 10 according to an exemplary embodiment of the present invention uses the laser image projection principle, the light emitting hole 52 may be a hole in a housing of the main body unit 50. However, when an LCD panel is used as the image producing unit of the projector/projection type switchable display apparatus 10, a projection optical system to project an image can be installed in the light emitting hole 52.

The projector/projection type switchable display apparatus according to the present invention can be used for mobile equipment and can display an image in a projection mode or in a projector mode as required. Thus, a user can view an image in a small room like on a subway or bus by oneself in a projection mode, or the user can view a relatively large image with many people in a projector mode when in a larger room.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A projector/projection switchable display apparatus comprising:
   a main body unit comprising an image producing unit forming and emitting an image; and
   a cover unit that is rotatably connected to the main body unit;
   wherein the cover unit comprises:
      an aspherical mirror, disposed within the cover unit, along an edge of the cover unit which is closest to the main body unit when the cover unit is positioned at a right angle to the main body unit, for enlarging and reflecting the image emitted from the main body unit; and
      a screen on which the image enlarged and reflected by the aspherical mirror is displayed.

2. The display apparatus of claim 1, wherein a light emitting hole through which the image is emitted is formed in a side of the main body unit.

3. The display apparatus of claim 2, wherein, when the cover unit is at a right angle to the main body unit, the aspherical mirror automatically faces the light emitting hole of the main body unit, and the image is reflected by the aspherical mirror and displayed on the screen of the cover unit in a projection mode, and when the cover unit is folded over a top surface of the main body unit, the image emitted from the main body unit is directly displayed on an external screen in a projector mode.

4. The display apparatus of claim 2, further comprising a projection optical system installed in the light emitting hole of the main body unit to project the emitted image.

5. The display apparatus of claim 1, wherein the image producing unit comprises:
   a plurality of light sources respectively emitting light beams having different wavelengths;
   a plurality of light modulators respectively modulating the light beams according to color signals;
   a light synthesizing unit respectively synthesizing the light beams modulated by the light modulators into a single beam; and
   vertical and horizontal micro scanning mirrors scanning the synthesized beam in a vertical direction and a horizontal direction, respectively.

6. The display apparatus of claim 5, wherein the light sources are laser diodes (LDs) or light emitting diodes (LEDs).

7. The display apparatus of claim 5, wherein the light synthesizing unit comprises a plurality of dichroic mirrors that are arranged in a row on a light emitting surface of the light modulators and respectively reflect corresponding light beams and transmit the other light beams.

8. A projector/projection switchable display apparatus comprising:
   a main body unit that includes:
      a plurality of light sources respectively emitting light beams having different wavelengths;
      a plurality of light modulators respectively modulating the light beams according to color signals;
      a light synthesizing unit respectively synthesizing the light beams modulated by the light modulators into a single beam; and
      vertical and horizontal micro scanning mirrors scanning the synthesized beam in a vertical direction and a horizontal direction, respectively; and
   a cover unit rotatably connected to the main body unit, that includes:
      an aspherical mirror disposed within the cover unit, along an edge of the cover unit which is closest to the main body unit when the cover unit is positioned at a right angle to the main body unit, for enlarging and reflecting the synthesized beam emitted from the main body unit; and
      a screen on which the synthesized beam enlarged and reflected by the aspherical mirror is displayed.

9. The display apparatus of claim 8, wherein the light sources are laser diodes (LDs) or light emitting diodes (LEDs).

10. The display apparatus of claim 8, wherein the light synthesizing unit comprises a plurality of dichroic mirrors that are arranged in a row on a light emitting surface of the light modulators and respectively reflect corresponding light beams and transmit the other light beams.

11. The display apparatus of claim 8, wherein a light emitting hole through which the image is emitted is formed in a side of the main body unit.

12. The display apparatus of claim 8, wherein, when the cover unit is at a right angle to the main body unit, the aspherical mirror automatically faces the light emitting hole of the main body unit, and the image is reflected by the aspherical mirror and displayed on the screen of the cover unit in a projection mode, and when the cover unit is folded over a top surface of the main body unit, the image emitted from the main body unit is directly displayed on an external screen in a projector mode.

13. A switchable display apparatus, comprising:

a portable main body unit; and a cover unit that is rotatably connected to the main body unit;

wherein the main body unit has an image producing unit for forming and emitting an image, wherein the cover unit has an aspherical mirror disposed in the cover unit, along an edge of the cover unit closest to the main body unit when the cover unit is positioned at a right angle to the main body unit, for enlarging and reflecting the image emitted from the main body unit, and a screen for displaying the image that has been enlarged and reflected by the aspherical mirror, and wherein the switchable display apparatus is capable of displaying the image emitted by the main body unit on one of the screen of the cover unit and an external screen by rotating the cover unit.

* * * * *